(12) United States Patent
Ogino et al.

(10) Patent No.: US 7,439,632 B2
(45) Date of Patent: Oct. 21, 2008

(54) VEHICLE DOOR CONTROL SYSTEM

(75) Inventors: Kenichi Ogino, Toyota (JP); Kentaro Teshima, Kariya (JP); Kazunari Nakamura, Nishio (JP); Koji Yoshida, Obu (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 170 days.

(21) Appl. No.: 11/390,167

(22) Filed: Mar. 28, 2006

(65) Prior Publication Data

US 2006/0244312 A1   Nov. 2, 2006

(30) Foreign Application Priority Data

Apr. 28, 2005   (JP)   ............................. 2005-132708
Sep. 1, 2005    (JP)   ............................. 2005-253810

(51) Int. Cl.
B60R 25/00   (2006.01)

(52) U.S. Cl. ...................... 307/10.2; 307/9.1

(58) Field of Classification Search .................. 307/9.1, 307/10.2
See application file for complete search history.

(56) References Cited

U.S. PATENT DOCUMENTS 4,183,177 A   1/1980   Kurdziel

| | | | |
|---|---|---|---|
| 6,226,925 B1 * | 5/2001 | Shimura et al. | 49/360 |
| 6,405,485 B1 * | 6/2002 | Itami et al. | 49/280 |
| 2003/0117267 A1 * | 6/2003 | Tang et al. | 340/5.72 |
| 2004/0119628 A1 * | 6/2004 | Kumazaki et al. | 341/176 |
| 2004/0130442 A1 * | 7/2004 | Breed et al. | 340/443 |

FOREIGN PATENT DOCUMENTS

| | | |
|---|---|---|
| JP | 11-093485 | 4/1999 |
| JP | 11-200683 | 7/1999 |
| JP | 2000-274124 | 10/2000 |
| JP | 2003-206674 | 7/2003 |
| JP | 2004-068318 | 3/2004 |
| JP | 2005-009200 | 1/2005 |
| KR | 2005029845 A * | 3/2005 |

* cited by examiner

*Primary Examiner*—Michael J Sherry
*Assistant Examiner*—Dru M Parries
(74) *Attorney, Agent, or Firm*—Nixon & Vanderhye PC

(57) ABSTRACT

A vehicle door control system provides increased usability convenience to users by a function for automatically opening and closing vehicle doors. When a response signal has been continuously received over a predetermined period from a portable device in response to a request signal periodically transmitted from a vehicle unit, it can be inferred that the holder of the portable device has not merely passed by the vehicle but stays in the vicinity of the vehicle with the will to ride in the vehicle. Therefore, vehicle doors having the automatic opening/closing function are unlocked and automatically opened. This eliminates a need for the holder of the portable device to command the operations of unlocking and automatically opening the vehicle doors.

8 Claims, 11 Drawing Sheets

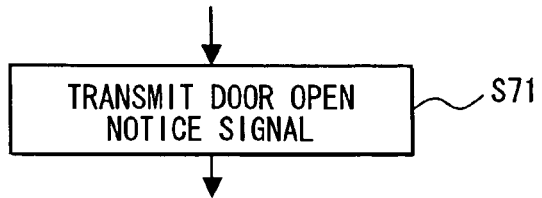
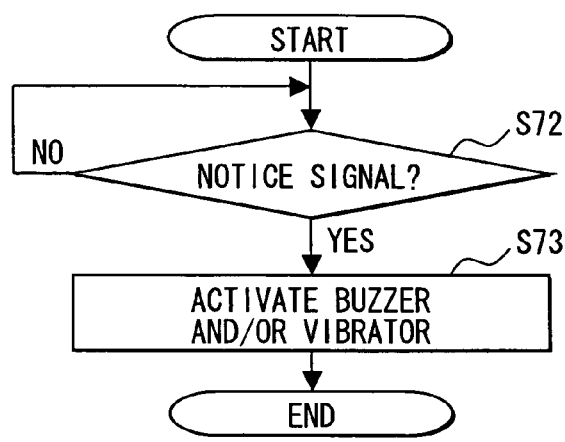
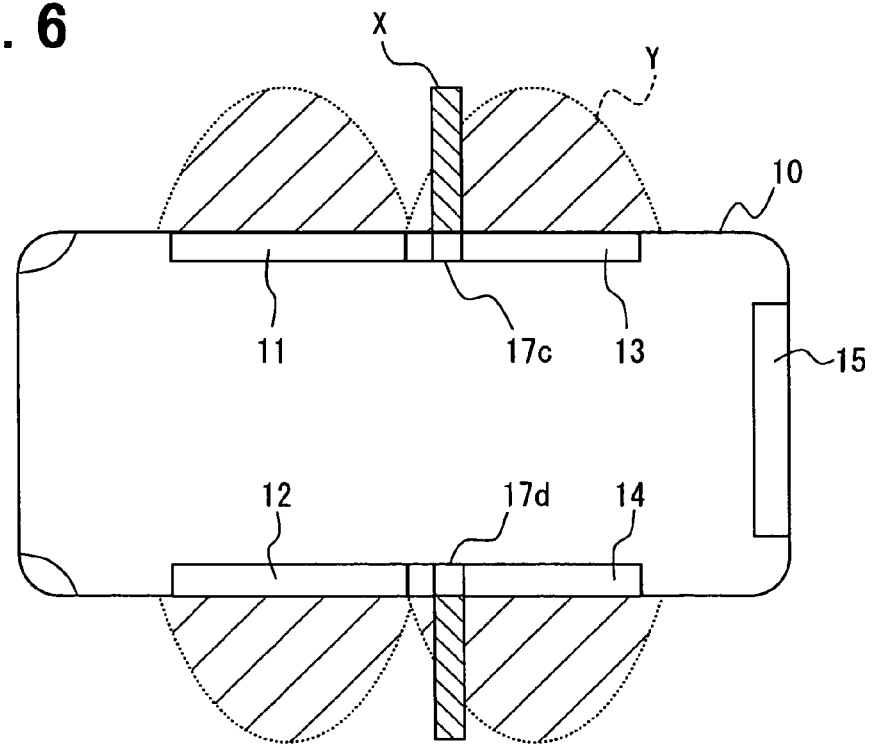

FIG. 18

| SLIDING DOOR (DRIVER'S SIDE) | LOCK | UNLOCK STANDBY SLIDE OPEN STANDBY | UNLOCK AND SLIDE OPEN |
|---|---|---|---|
| REQUIREMENT TO NEXT CONDITION | ID OK BY TRANSMITTER 2a, 2c | ID OK CONTINUOUSLY BY TRANSMITTER 2a, 2c | |
| INDICATOR 6c1 OF SLIDING DOOR 13 | OFF | BLINK | ON | OFF |
| OTHER DOORS | LOCK | ONLY UNLOCK |
| INDICATOR 6d1 OF SLIDING DOOR 14 | OFF |

VEHICLE DOOR CONTROL SYSTEM

CROSS REFERENCE TO RELATED APPLICATION

This application is based on and incorporates herein by reference Japanese Patent Applications No. 2005-132708 filed on Apr. 28, 2005 and No. 2005-253810 filed on Sep. 1, 2005.

FIELD OF THE INVENTION

The present invention relates to a vehicle door control system, which controls vehicle door conditions based on intercommunications between a portable device and a vehicle unit.

BACKGROUND OF THE INVENTION

A conventional vehicle door control system controls the lock and unlock conditions of individual doors based on a result of checking an ID code by bidirectional communications between a portable electronic key (portable device) and a vehicle electronic control unit mounted on a vehicle. In this system, proper communication areas are set inside and outside the vehicle. A request signal is transmitted in a fixed interval from transmitters in the vehicle unit. In this way, the system monitors that the holder of the portable device approaches, rides in and gets off the vehicle.

For example, when the holder of the portable device approaches the vehicle to ride in the vehicle and enters a communication area, in response to the request signal, the portable device returns a response signal including its ID code to the vehicle unit. When it is determined that a required relation is satisfied, that is, when the ID code acquired from the portable device coincides with a registered ID code in the vehicle unit, the vehicle unit sends a control signal to a door lock control device of the vehicle to drive individual doors into an unlock standby state. When the holder of the portable device touches a door handle in this state, the door lock control device detects it by a touch sensor or the like, and unlocks the door.

When the holder of the portable device gets off the vehicle after stopping a vehicle engine, the area of communication with the portable device shifts from the interior of the vehicle to the exterior of the vehicle. In this case, when a door switch provided near a door handle is operated, the door is locked.

According to the above system, the holder of the portable device can lock and unlock the doors without holding the portable device in hand, providing increased usability to the holder of the portable device.

Recently, an increasing number of vehicles have slide doors and rear doors equipped with an automatic opening/closing device that automatically opens and closes the doors by using an electric motor or the like as a power source. Some of such vehicles also include the above vehicle door control system. However, the automatic opening/closing device and the vehicle door control system operate independently from each other.

Specifically, the automatic opening/closing device is ordinarily actuated by operating an opening/closing switch provided in the portable device, or operates to automatically open the doors after the doors are unlocked, and then opened by a required degree of opening. The above vehicle door control system, locks and unlocks the doors through intercommunications between the portable device and the vehicle unit. Thus, the automatic opening/closing device and the vehicle door control system operate independently from each other although they control the same vehicle doors.

SUMMARY OF THE INVENTION

The present invention has an object to improve a vehicle door control system that controls vehicle door conditions based on intercommunications between a portable device and a vehicle unit.

According to one aspect of the present invention, a vehicle door control system unlocks vehicle doors and automatically opens the vehicle doors, when it is inferred that a holder of a portable device is going to ride in a vehicle.

According to another aspect of the present invention, a vehicle door control system automatically closes vehicle doors and locks the vehicle doors, when intercommunications with a portable device by a vehicle exterior communication device are disabled, after it is determined that the portable device is outside the vehicle because the intercommunications with the portable device by the vehicle exterior communication device are possible with the vehicle doors opened and intercommunications with a portable device by a vehicle interior communication device are impossible.

According to a further aspect of the present invention, a vehicle door control system automatically closes vehicle doors when either of an operation and voice of a holder of a portable device that is indicative of the closing of the vehicle doors is detected, after it is determined that a portable device is outside the vehicle because intercommunications with the portable device by a vehicle exterior communication device are possible with the vehicle doors opened and intercommunications with the portable device by a vehicle interior communication device are impossible.

BRIEF DESCRIPTION OF THE DRAWINGS

The above and other objects, features and advantages of the present invention will become more apparent from the following detailed description made with reference to the accompanying drawings. In the drawings:

FIG. 3 is a flowchart showing riding-time control processing in the vehicle unit according to a second embodiment of the present invention;

FIG. 4 is a flowchart showing riding-time control processing performed in the portable device according to the second embodiment;

FIG. 6 is a schematic diagram showing a detection range of an infrared sensor for detecting a portable device in the third embodiment;

FIG. 18 is a table showing lighting conditions of indicators in the vehicle unit according to a ninth embodiment of the present invention.

DESCRIPTION OF THE PREFERRED EMBODIMENTS

First Embodiment

Figure 1:
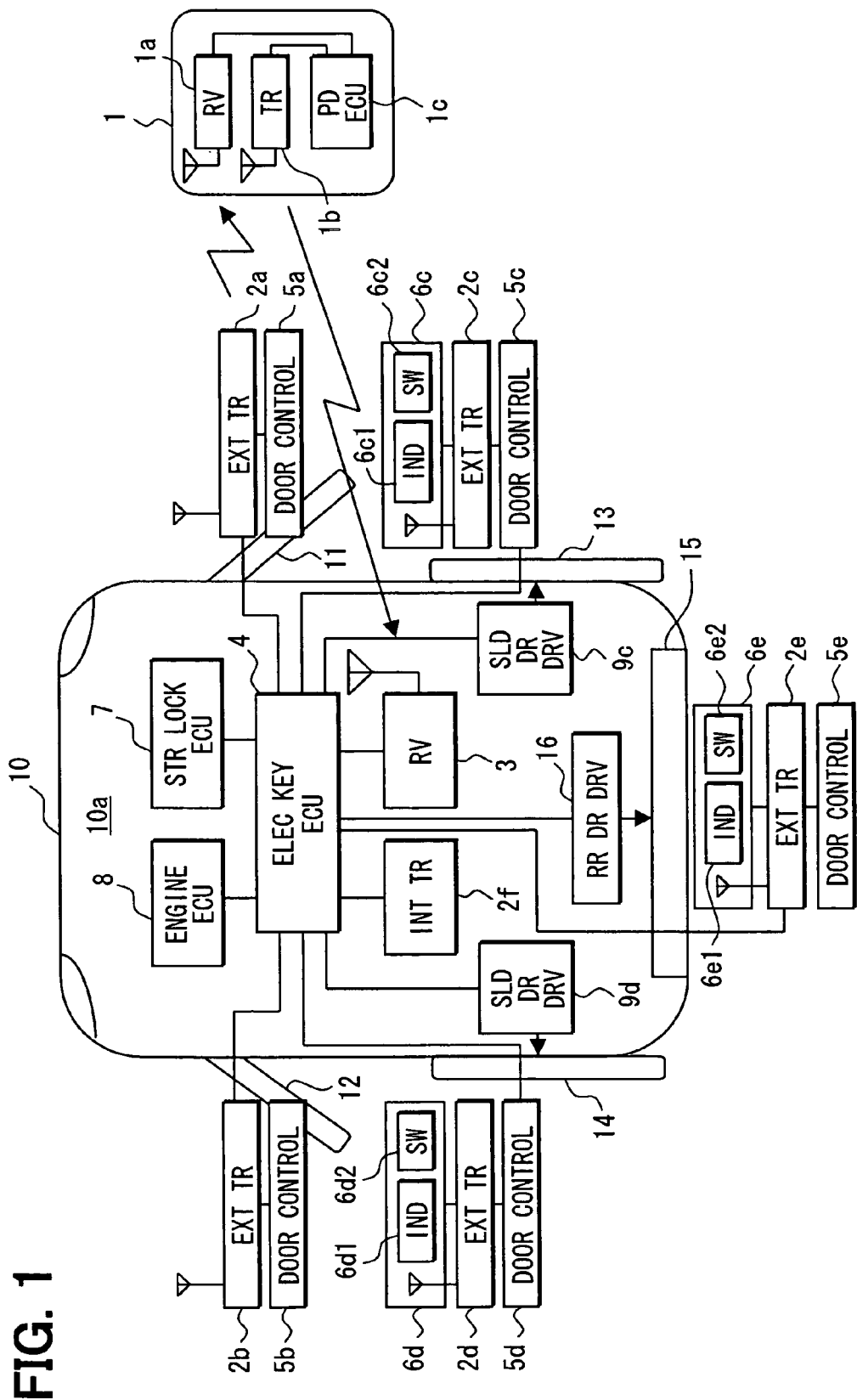
FIG. 1 is a block diagram showing a vehicle door control system according to a first embodiment of the present invention.

Referring first to FIG. 1, a vehicle door control system is constructed with a portable device (electronic key) 1 carried by a user of a vehicle 10 and a vehicle unit 10a mounted in the vehicle 10. The vehicle unit 10a has an electronic key ECU 4, which locks or unlocks each door 11 to 15 based on the result of checking an ID code over bidirectional communication between the portable device 1and the vehicle unit 10a. To improve the security of the vehicle 10, the electronic key ECU 4 controls steering lock and permits or prohibits the engine starting of the vehicle 10. Moreover, the electronic key ECU 4 determines, from the conditions of communication between the vehicle unit 10a and the portable device 1, that a holder of the portable device 1 is going to ride in the vehicle 10, and automatically opens the doors.

The portable device 1 includes a receiver 1a that receives a request signal from the vehicle unit 10a, and a transmitter 1b that transmits a response signal including its ID code and the like in response to the reception of the request signal. The portable device ECU 1c is connected with the above receiver 1a and the transmitter 1b, and executes various control processing. Specifically, the portable device ECU 1c determines whether a request signal has been received, based on a receive signal of the receiver 1a, and in response to the request signal, generates a response signal including device-specific ID code and the like, and transmits it from the transmitter 1b.

The vehicle unit 10a includes external transmitters 2a to 2e provided in the doors 11 to 15 of the vehicle 10 and an internal transmitter 2f provided in the vehicle interior. The external transmitters 2a to 2e and the internal transmitter 2f transmits respective request signals, based on a transmission command signal from the electronic key ECU 4, which is a main part of the vehicle unit 10a.

The vehicle 10 is provided with hinged vehicle doors 11 and 12, corresponding to front seats, and with sliding type vehicle doors 13 and 14 corresponding to rear seats. These sliding type vehicle doors 13 and 14, which are provided with slide door driving units 9c and 9d that are driven by motors, can be automatically opened and closed according to opening/closing signals from the electronic key ECU 4. The vehicle 10 also includes a springing-up or swing-type rear door 15. Like the slide door driving units 9c and 9d, the rear door 15 is provided with a rear door driving unit 16 that is driven by a motor, and can be automatically opened and closed according to an opening/closing signal from the electronic key ECU 4. Since the sliding type vehicle doors 13 and 14 and the rear door 15 are relatively heavy, by providing an automatic opening/closing function, burdens on vehicle occupants when riding in or getting off vehicle can be reduced.

Each range of reach of a request signal of the external transmitters 2a to 2e is set to, for example, approximately 1.0 m. Accordingly, when the vehicle 10 is parking, a communication area corresponding to the reach range of the request signal is formed on the periphery of the doors 11 to 15 of the vehicle 10 so that it can detect that the portable device 1 is approaching the vehicle 10. A communication area of the internal transmitter 2f is set to generally cover only the interior of the vehicle so that it can determine whether the portable device 1 is in the interior of the vehicle 10.

The vehicle unit 10a is provided in the interior of the vehicle 10, and includes a receiver 3 that is made ready to receive a response signal synchronously with the output of a transmission command signal to the transmitters 2a to 2f, and receives the response signal transmitted from the portable device 1. The response signal received by the receiver 3 is outputted to the electronic key ECU 4. The electronic key ECU 4 determines whether to perform control including door locking and unlocking based on a result of checking the ID code included in the received response signal.

Moreover, the vehicle unit 10a includes door lock control devices 5a to 5e that are provided in the respective doors 11 to 15 of the vehicle 10 to lock or unlock the doors 11 to 15. The door lock control devices 5a to 5e operate according to a command signal from the electronic key ECU 4.

In the vehicle 10, door handles 6c to 6e of the doors 13 to 15 provided with the automatic opening/closing function are equipped with indicators 6c1, 6c2 and 6e1. The indicators 6c1 to 6e1 turn on, for example, when ID code checking is determined as OK, informing the holder of the portable device 1 that one of conditions for automatically opening or closing the doors 13 to 15 has been satisfied.

Indicators may also be provided in the doors 11 and 12 not provided with the automatic opening/closing function to indicate the result of ID code checking. The indicators may be provided in not only the door handles 6c to 6e of the doors 13 to 15 but also, for example, door trims in the interior of the vehicle 10. Moreover, a winker mirror and the like attached to a hazard lamp and a door mirror already mounted in the vehicle 10 may be used as an indicator.

Although not shown in the figure, the vehicle 10 is provided with a buzzer for informing the holder of the portable device 1 that the doors are automatically opened or closed. When the buzzer sounds when the indicators turn on, the holder of the portable device 1 can recognize that a door which the holder is approaching is to be automatically opened. When the ID code checking is determined as OK, first the indicators turn on. Then when it is inferred that the holder of the portable device 1 is going to ride in the vehicle 10, the buzzer is sounded and the doors are automatically opened. With this, the steps of operations for automatic opening/closing of the vehicle doors in the vehicle can be accurately indicated to the holder of the portable device 1. Automatic opening of the doors may be indicated not only by the buzzer but also voice.

The door handles 6c to 6e are provided with cancel switches 6c2 to 6e2 of the automatic opening/closing function constructed as push switches. When the cancel switches 6a2 to 6e2 are operated, automatic opening/closing operations are prohibited. The doors 13 to 15 will not be automatically opened or closed even when conditions for automatically opening and closing the doors 13 to 15 are satisfied. The cancel switches 6c2 to 6e2 are provided to meet the possible desire to avoid the automatic opening/closing operations in terms of conditions around the vehicle 10 and the convenience of the holder of the portable device 1. Although not shown in the figure, a cancel switch is also provided on the periphery of a driver's seat in the vehicle interior, and can be operated inside the vehicle 10. By thus providing the cancel switches 6c2 to 6e2 outside and inside the vehicle, automatic opening and closing of the doors 13 to 15 can be prohibited in advance. The door handles 6a to 6e also serve as antennas of the above external transmitters 2a to 2e.

In this embodiment, the doors 11 to 15 are locked or unlocked based on the result of ID code checking or the like. However, an operation unit that commands the locking and unlocking of a door may be provided in each of the vehicle doors 11 to 15. For example, a touch sensor may be provided in a door handle of each of the vehicle doors 11 to 15 so that the door is locked or unlocked as soon as the touch sensor detects that the holder of the portable device 1 touches the door handle.

To enhance the security of the vehicle 10, the vehicle door control system according to this embodiment includes a steering lock ECU 7 and an engine ECU 8. The steering lock ECU 7 and the engine ECU 8, according to command signals from the electronic key ECU 4, turn on or off a steering lock, and permit or prohibit the startup of a vehicle engine. Processing by the steering lock ECU 7 and the engine ECU 8 will be made as follows.

When the holder of the portable device 1 opens a door to ride in the vehicle 10, and operates an engine switch provided in the vehicle, the electronic key ECU 4 performs bidirectional communication with the portable device 1 by using the internal transmitter 2f and the receiver 3 provided in the vehicle interior, and checks an ID code. On the other hand, the steering lock ECU 7 inquires of the electronic key ECU 4 whether to unlock the steering lock. When the result of checking the ID code is OK, the electronic key ECU 4 returns to the steering lock ECU 7 a response indicating the permission to unlock the steering lock. According to the response, the steering lock ECU 7 unlocks the steering lock. In this way, the steering lock is controlled. Furthermore, at this time, the electronic key ECU 4 outputs a command to release the prohibition of engine startup to the engine ECU 8.

When the holder of the portable device 1 approaches the doors 13 to 15 provided with the automatic opening/closing function, the electronic key ECU 4 unlocks the doors and automatically opens them, based on the result of checking the ID code over bidirectional communication between the portable device 1 and the vehicle unit 10a. The key ECU 4 performs riding-time control shown in FIG. 2 to makes it unnecessary for the holder of the portable device 1 to unlock the vehicle doors 11 to 15, and then issues a command to automatically open the vehicle doors 11 to 15, increasing the convenience of the holder of the portable device 1.

Figure 2:
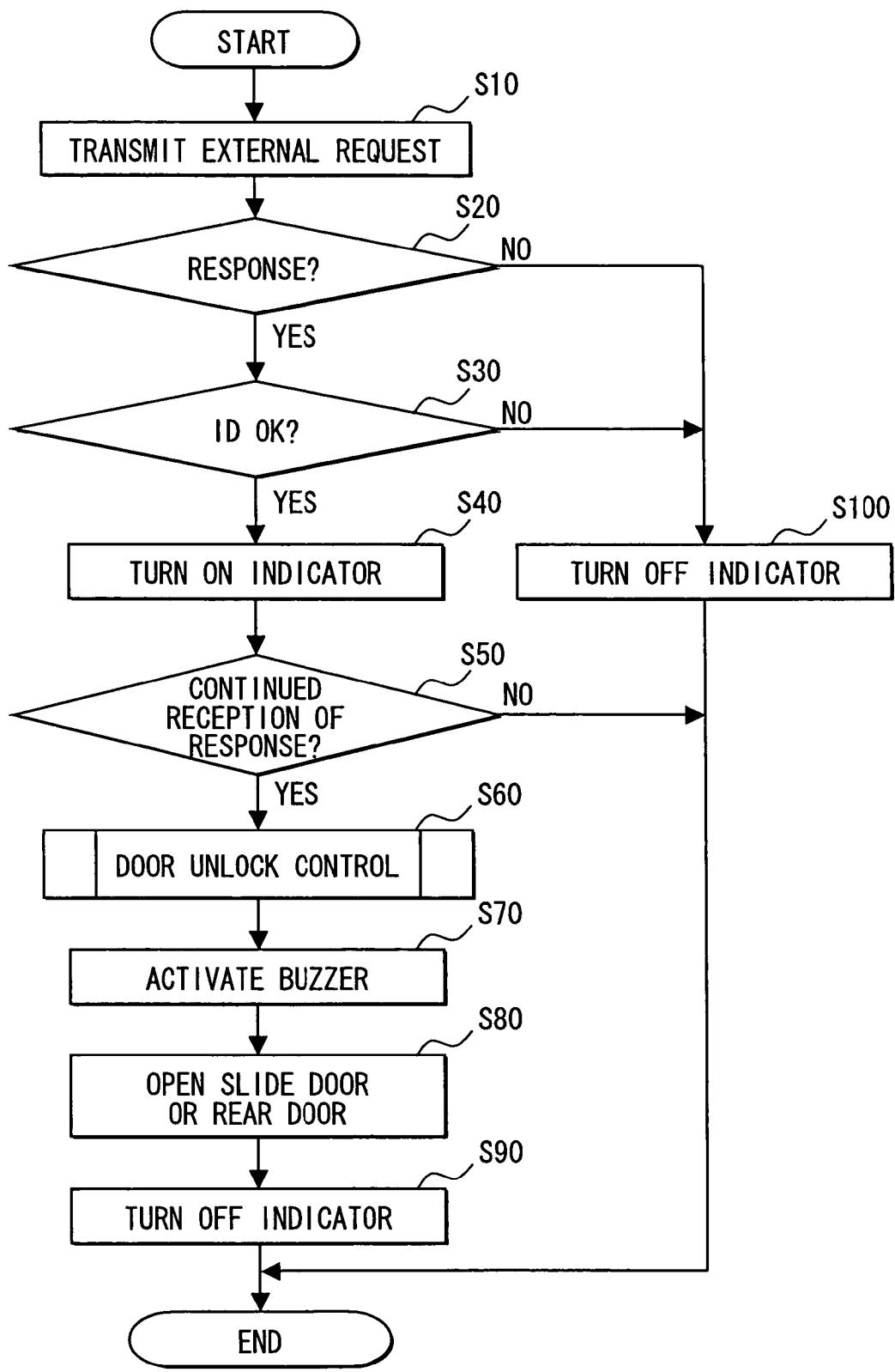
FIG. 2 is a flowchart showing processing for performing riding-time control in a vehicle unit according to the first embodiment.

Processing shown in FIG. 2 is performed every predetermined time. Specifically, when the vehicle 10 is parked with the engine stopped and all the doors 11 to 15 locked, the key ECU 4 commands every predetermined time the external transmitters 2a to 2e to transmit externally a request signal to check whether a holder of the portable device 1 approaches the vehicle 10. When the holder of the portable device 1 approaches the doors 11 to 12 not provided with the automatic opening/closing function, only processing to unlock the doors is performed. The details of the processing of the vehicle unit 10a will be described below as processing of the key ECU 4 even though some steps are actually attained by other than the key ECU 4 as long as such operations are instructed by the key ECU 4.

In step S10, the key ECU 4 outputs a transmission command signal to the external transmitters 2a to 2e to transmit externally the request signal from the external transmitters 2a to 2e. In step S20, it determines whether a response signal from the portable device 1 has been received in the receiver 3 in response to the request signal. When no response signal has been received, it determines that the portable device 1 is not within the communication area, and proceeds to processing of step S100. On the other hand, when a response signal from the portable device 1 has been received, it proceeds to processing of the following step S30.

In this embodiment, from the external transmitters 2a to 2e, a request signal including an identification code (ID) unique to each of the external transmitters 2a to 2e is transmitted, and the portable device 1 returns a response signal including its identification code (ID). Alternatively, the electronic key ECU 4 may command the transmitters 2a to 2e to transmit request signals in order. Thus, the electronic key ECU 4 can determine to which of the transmitters 2a to 2e the portable device 1 has returned the response signal in response. Specifically, the electronic key ECU 4 can determine to which door 11 to 15 the holder of the portable device 1 is approaching.

In step S30, the key ECU 4 determines whether a required relation is satisfied, such as whether an ID code included in the response signal coincides with an ID code pre-registered (ID code checking OK/NG determination). When the ID code checking is determined as OK in the determination processing, the system transfers control to step S40. When the ID code checking is determined as NG (not good), it transfers control to step S100.

In step S40, the key ECU 4 turns on one of the indicators 6c1 to 6e1 of the door that the holder of the portable device 1 is approaching, to indicate to the holder of the portable device 1 that the result of ID code checking is OK and one of conditions for automatically opening or closing the door has been satisfied. Conversely, in step S100, since the authorized portable device 1 does not approach the vehicle 10, the key ECU 4 turns off the indicators 6c1 to 6e1.

After turning on the indicators 6c1 to 6e1 in step S40, the key ECU 4 proceeds to processing of step 50. In step S50, it determines whether a response signal has been continuously received over a second predetermined period longer than a predetermined period during which a request signal is transmitted. Specifically, the system stores the result of receiving a response signal when ID checking is determined as OK, and determines whether the response signal has been continuously stored over the second predetermined period or longer.

In the determination processing of step S50, when it is determined that the response signal has been continuously received over the second predetermined period or longer, it can be determined that the holder of the portable device 1 has not merely passed by the vehicle 10 but has stayed in the vicinity of the vehicle 10 for at least the second predetermined period. Hence, it can be inferred that the holder of portable device 1 is going to ride in the vehicle. In this case, the processing proceeds to step S60 to unlock the door. In the door unlock control, a corresponding one of the door lock control devices 5a to 5e may be commanded to unlock only the door that the holder of the portable device 1 approaches, or the door lock control devices 5a to 5e may be commanded to unlock all the doors 11 to 15.

In step S70, the key ECU 4 sounds the buzzer to notify the holder of the portable device 1 that the door that he or she approaches is automatically opened. Since the indicator turns on, and the buzzer sounds, the holder of the portable device 1 can recognize that the door toward which he (she) is heading will be automatically opened.

In step S80, the key ECU 4 regards the door 13 to 15 equipped with the external transmitter 2c to 2e that has communicated with the portable device 1 as the door that the holder of the portable device 1 is to use when riding in the vehicle, and automatically opens the door by the slide door driving unit 9c, 9d or the rear door driving unit 16. The term of "riding in the vehicle" includes the operation that the holder of the portable device 1 opens the rear door 15 and loads baggage and the like into the vehicle.

In step S90, the key ECU 4 turns off the indicator turned on in step S40. The indicator is continuously lighted until the door is automatically opened after the ID checking is determined as OK, or until the communication with the portable device 1 is disabled because the holder of the portable device 1 has left the vehicle.

As has been described above, in the vehicle door control system according to the first embodiment, when the vehicle key ECU 4 infers that the holder of the portable device 1 will ride in the vehicle because ID code checking is determined as OK and he (she) has stayed in the vicinity of the vehicle doors 13 to 15 provided with the automatic opening function, the vehicle unit 10a automatically opens the vehicle doors 13 to 15 synchronously with the unlocking of the vehicle doors 13 to 15. This eliminates a need for the holder of the portable device 1 to command the unlocking of the vehicle doors 13 to 15, and then further command the execution of automatic opening of the vehicle doors 13 to 15, providing greater usability to the holder of the portable device 1.

In the above embodiment, in step S50 (FIG. 2), it is determined whether a response signal has been continuously received over the second predetermined period or longer. However, it may be determined whether a predetermined number of response signals or more corresponding to the second predetermined period have been continuously received.

In the first embodiment, when the holder of the portable device 1 approaches the doors 13 to 15 provided with the automatic opening function, only a corresponding door is automatically opened. However, when the holder of the portable device 1 approaches any one of the doors 13 to 15 provided with the automatic opening function, all the doors 13 to 15 may be automatically opened. Or, when the holder of portable device 1 stays in the vicinity of the doors 11 and 12 not provided with the automatic opening/closing function, while all the doors are unlocked, the doors 13 to 15 provided with the automatic opening/closing function may be automatically opened.

In the first embodiment, the doors are automatically opened synchronously with their unlocking. As an alternative method, however, while the doors are unlocked when ID checking is determined as OK, the doors 13 to 15 may be automatically opened when a response signal that the ID checking is determined as OK has been continuously received over the second predetermined period or longer. In this case, the opening operation can be started immediately when all conditions for automatically opening the doors are satisfied after inferring the holder's will of the portable device 1 to ride in the vehicle.

However, when the doors are unlocked when ID code checking is determined as OK, the doors may be unlocked when the holder of the portable device 1 merely passes by the vehicle. Therefore, when the holder of the portable device 1 goes away from the vehicle, and intercommunications between the vehicle unit 10a and the portable device are disabled, the doors must be locked again in terms of security.

In the first embodiment, driving units 9c, 9d and 16 for automatic opening and closing are provided for the sliding type vehicle doors 13 and 14, and the rear door 15. However, it goes without saying that a driving unit may be provided for general hinged swing doors and provided with an automatic opening/closing function.

Second Embodiment

The vehicle door control system according to this embodiment is constructed similarly to the above vehicle door control system according to the first embodiment. A different point is that the portable device 1 has a vibrator or buzzer as a notice means because advance notice of automatic door opening is made not in the vehicle unit 10a but in the portable device 1.

In this embodiment, the key ECU 4 executes step S71 in FIG. 3 instead of step S70 of the flowchart of FIG. 2. Specifically, instead of sounding a buzzer in the vehicle, a door open notice signal is transmitted to the portable device 1.

On transmitting a response signal in response to a request signal from the vehicle unit 10a, the portable device 1 performs processing shown in a flowchart of FIG. 4. In step S72, it determines whether it has received a door open notice signal from the vehicle unit 10a. When it is determined in step S72 that a door open notice signal is not received, the portable device 1 waits to receive the door open notice signal. On the other hand, on determining that it has received the door open notice signal, it proceeds to S73 and vibrates a built-in vibrator and/or sounds a built-in buzzer to notify the holder of the portable device 1 that the door will soon be automatically opened.

By thus transmitting the door open notice signal from the vehicle unit 10a to the portable device 1, the door being automatically opened can be indicated to the holder of the portable device 1, not in the vehicle unit 10a but in the portable device 1.

Third Embodiment

The vehicle door control system according to this embodiment is constructed similarly to the vehicle door control system according to the first embodiment.

In the first embodiment, when the response signal has been continuously received over the second predetermined period or longer, it is inferred that the holder of the portable device 1 stays in the vicinity of the door, and has the will to ride in the vehicle. To the contrary, in this third embodiment, when intercommunications between the vehicle unit 10a and the portable device 1 are performed in a communication area initially set, the communication area is reduced to retry intercommunications between the vehicle unit 10a and the portable device 1. When intercommunications between the vehicle unit 10a and the portable device 1 have been performed in the reduced communication area, it means that the holder of the portable device 1 is approaching a vehicle door. It is inferred that the holder of the portable device 1 has the will to ride in the vehicle.

Figure 5:
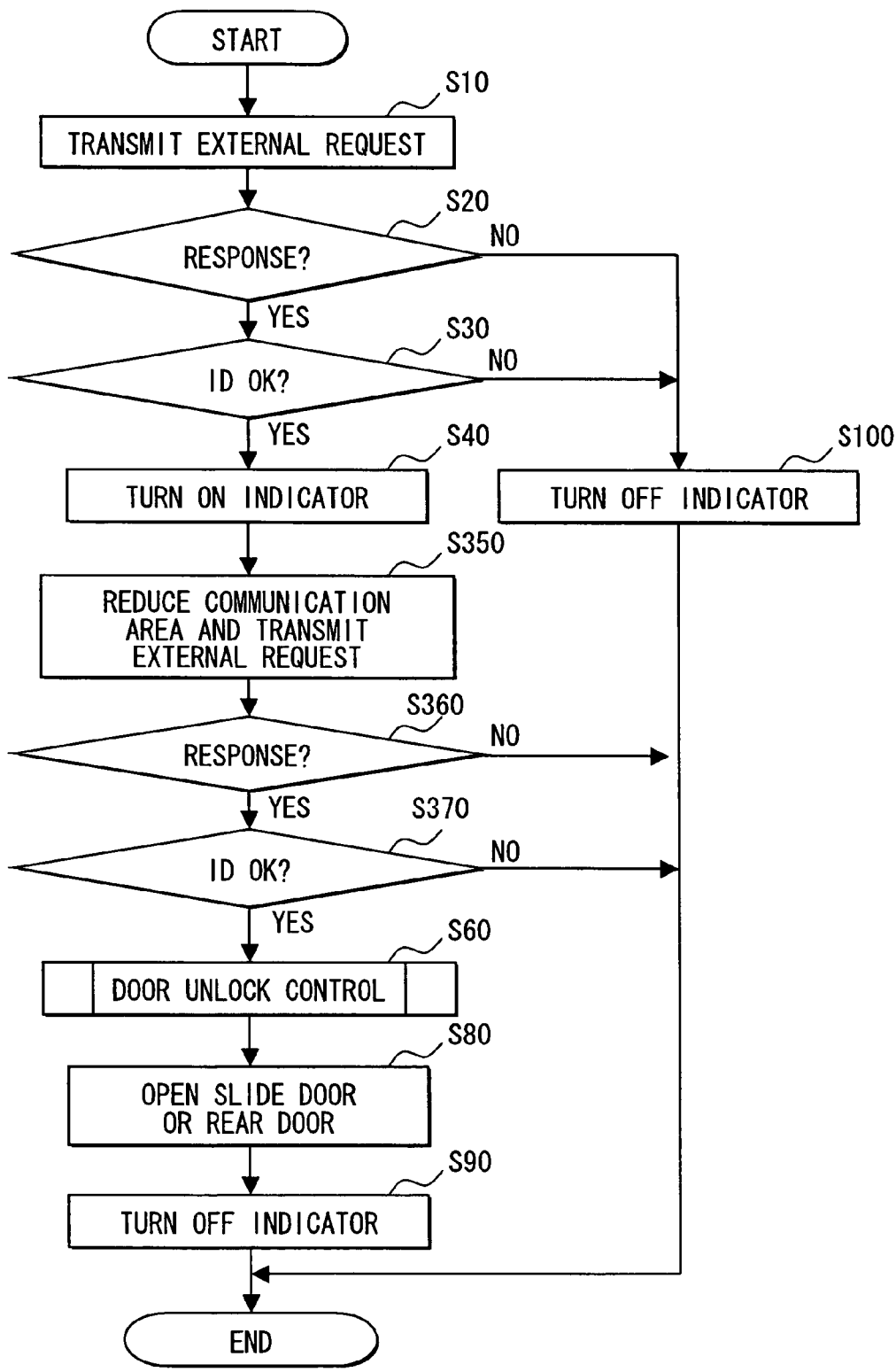
FIG. 5 is a flowchart showing processing for riding-time control executed in a vehicle unit according to a third embodiment of the present invention.

FIG. 5 is a flowchart showing processing for riding-time control executed in the key ECU 4 of this embodiment. The flowchart of FIG. 5 is different from the flowchart of FIG. 2 only in processing of steps S350 to S370. When a response signal from the portable device 1 is received in a communication area initially set, and the checking of the ID code included in the response signal is determined as OK in step S30, processing in step S350 is executed. In step S350, the key ECU 4 reduces the communication area and again transmits the request signal from the external transmitters 2a to 2e. Reduction in the communication area may be made for the external transmitters 2a to 2e that has already communicated with the portable device 1, or may be made for all the external transmitters 2a to 2e.

For reducing a communication area between the vehicle unit 10a and the portable device 1, the following communication procedure is performed in bidirectional communication between each external transmitter 2a to 2e in the vehicle unit 10a and the portable device 1. It is assumed that the portable device 1 communicates with the external transmitter 2a in the vehicle unit 10a.

Before communication is started, the portable device 1 is in sleep state. Accordingly, the external transmitter 2a transmits an activation request signal to wake up the portable device 1. The portable device 1 wakes up according to the activation request signal, and returns a first acknowledgment signal (first ACK signal). When the receiver 3 receives the first ACK signal, the external transmitter 2a transmits a first transmission request signal that includes a vehicle ID code unique to the vehicle and requests the return of a second ACK signal when the portable device 1 has the same vehicle ID code. On receiving the first transmission request signal, the portable device 1 returns the second ACK signal when it has the same vehicle ID code as the vehicle ID code included in the first transmission request signal.

When the receiver 3 receives the second ACK signal, the external transmitter 2a transmits a second transmission request signal that includes a code unique to the transmitter and requests the transmission of the ID code. The portable device 1 uses the code included in the second transmission request signal to create a response code, and transmits a reply signal including the response code and ID code. When the external transmitter 2a transmits the activation request signal and the first transmission request signal, and the first and the second ACK signals are not returned, the key ECU 4 determines that the portable device 1 does not exist in the communication area, and terminates communication.

As described above, since a response code is created by using a code unique to a transmitter, the electronic key ECU 4 can determine from the response code in response to a signal from which transmitter the portable device transmitted a reply signal. In the above communication processing, the activation request signal and the first and the second transmission request signals correspond to request signals transmitted from the transmitter and the first and the second ACK signals. The reply signal correspond to response signals transmitted from the portable device 1. In the above communication procedure, the transmission of the first transmission request signal from the vehicle unit 10a and the transmission of the second ACK signal from the portable device 1 that corresponds to it may be omitted.

For reducing the area of communication between the vehicle unit 10a and the portable device 1, it is necessary to set at least one of the output strength level of a request signal transmitted from the vehicle unit 10a and a receiver sensitivity level of the request signal in the portable device 1 lower than a normal level.

For the output strength level of the request signal, since the vehicle unit 10a can recognize the result of ID code checking, the output strength level needs to be set lower than the normal level after the checking is determined as OK.

On the other hand, since the portable device 1 cannot recognize the result of ID code checking, it receives an indication on a receiving strength level from the vehicle unit 10a, and sets receiver sensitivity to the indicated level. Specifically, before the result of ID checking is determined as OK, the vehicle unit 10a transmits an activation request signal A to the portable device 1. On the other hand, after the result of ID checking is determined as OK, the vehicle unit 10a transmits an activation request signal B different from the activation request signal A. Thus, the vehicle unit 10a transmits two types of activation request signals to the portable device 1.

When the portable device 1 receives an activation request signal from the vehicle unit 10a, it returns the first ACK signal, and determines whether it is an activation request signal A or an activation request signal B. When determining from the determination processing that the activation request signal is the signal B, the portable device 1 sets receiver sensitivity at the time of receiving the first and the second transmission request signals to a low level. The receiver sensitivity can be set to the low level, for example, by reducing an amplification degree of an amplifier of a receive signal in the receiver 1a of the portable device 1. Of course, the receiver sensitivity may be reduced by other methods. On the other hand, when the activation request signal is determined as the signal A, the portable device 1 maintains the receiver sensitivity at the normal level. In this way, the vehicle unit 10a can indicate a receiver sensitivity level to the portable device 1.

In step S360 of FIG. 5, the system determines whether the receiver 3 of the vehicle unit 10a has received a response signal from the portable device 1 in the reduced communication area. When it is determined in step S360 that a response signal is not received, the system determines that the holder of the portable device 1 does not approach a vehicle door close enough to infer the will to ride in the vehicle, and terminates processing shown in the flowchart of FIG. 5.

On the other hand, when it is determined in step S360 that a response signal has been received, the processing of key ECU 4 proceeds to step S370 to determine whether the checking of the ID code is OK or NG. When it is determined in the determination processing of step S360 that the checking of the ID code is OK, the key ECU 4 determines that the holder of portable device 1 is approaching the door to ride in the vehicle, and performs processing in and after step S60. Thus, when intercommunications between the vehicle unit 10a and the portable device 1 are maintained even when a communication area provided on the periphery of a vehicle door is narrowed, it means that the holder of the portable device 1 is approaching the vehicle door. Therefore, the key ECU 4 infers that the holder of the portable device 1 has the will to ride in the vehicle. Further, like the first embodiment, the door is unlocked and automatically opened.

Fourth Embodiment

In the fourth embodiment, as shown in FIG. 6, the doors 13 and 14 provided with the automatic opening/closing function are respectively provided with sensors 17c and 17d, which may be infrared sensors, for detecting the holder of the portable device 1. The key ECU 4 infers that the holder of the portable device 1 is going to ride in the vehicle 10, based on a detection signal of the sensors 17c and 17d.

The sensors 17c and 17d are disposed on the outer surface of the doors 13 and 14 and near an opening appearing when the doors 13 and 14 are slidingly opened. In the case of the infrared sensors, the sensors 17c and 17d are constructed to have a relatively narrow detection range X in a substantially perpendicular direction with respect to the doors 13 and 14. The range X is narrower than the communication area Y of each external transmitter 2a to 2d. Use of the infrared sensors enables differentiation between obstacles such as pillars and walls, and the holder of the portable device 1 by a temperature of the holder of the portable device 1.

Since the sensors 17c and 17d have the above construction and displacement, when the holder of the portable device 1 is detected by the sensors 17c and 17d, and the detection continues for a predetermined period of time, it can be determined that the holder of the portable device 1 stops at the side where the doors 13 and 14 are opened. Since it can be regarded as a motion indicating the will to ride in the vehicle that the holder of the portable device stops near an opening of the vehicle doors, it can be inferred that the holder of the portable device 1 is going to ride in the vehicle.

Figure 7:
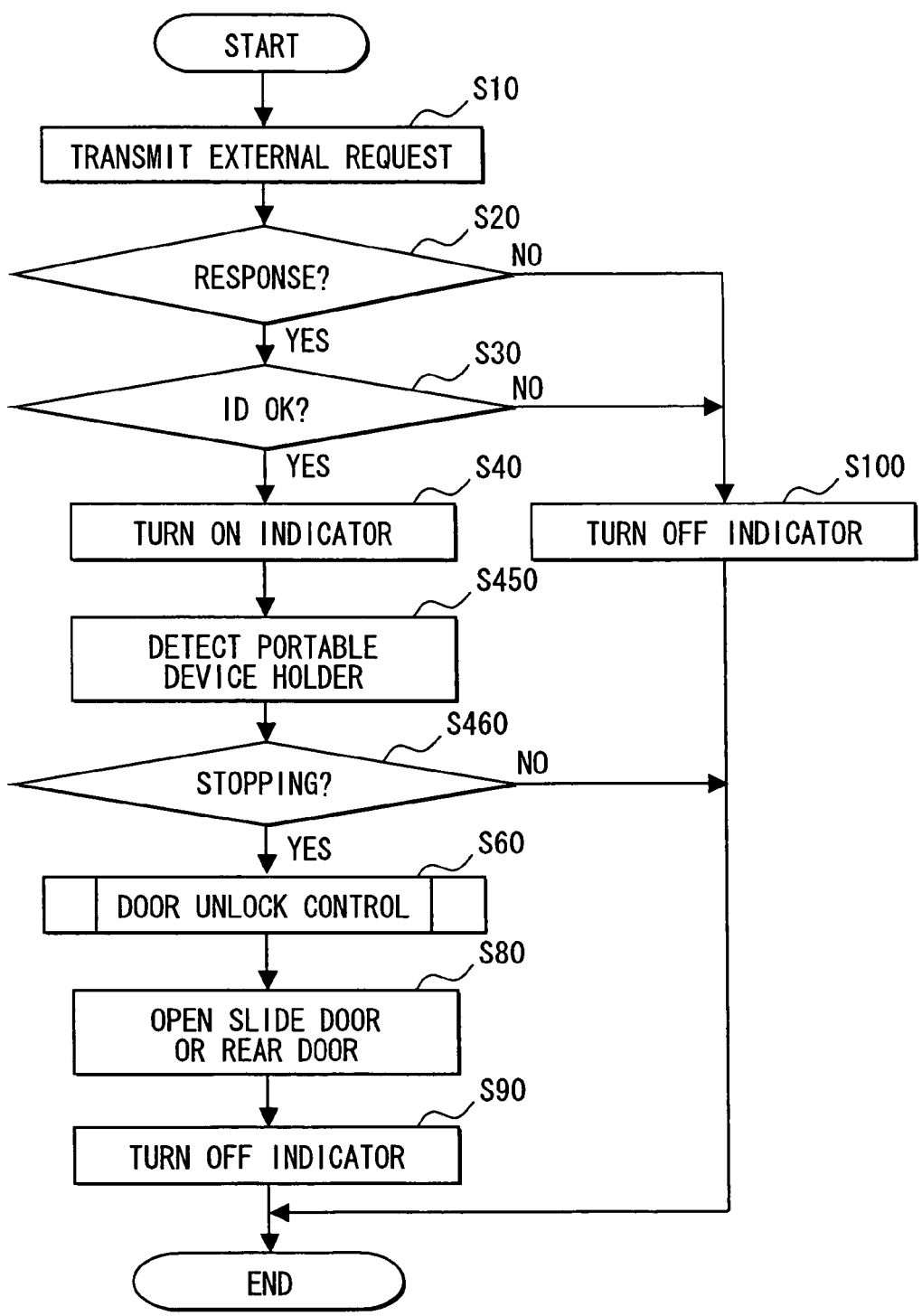
FIG. 7 is a flowchart showing processing for riding-time control executed in the vehicle unit according to a fourth embodiment of the present invention.

FIG. 7 is a flowchart showing processing for riding-time control executed in the vehicle unit 10a of this embodiment. The sensors 17c and 17d are infrared sensors. Since the flowchart of FIG. 7 is different from the flowchart of FIG. 2 only in processing of steps S450 and S460, only the different processing will be described in detail below.

When the holder of the portable device 1 approaches the doors 13 and 14 provided with the automatic opening/closing function, and both the determination processing of steps S20 and S30 result in "Yes," processing of step S450 is performed. Step S450 detects the holder of the portable device 1 using the infrared sensor 17 disposed in the door that the holder of the portable device 1 approaches. Step S460 determines whether the holder of the portable device 1 stops in the vicinity of the vehicle door, based on detection signals of the sensors 17c and 17d. For example, when the holder of the portable device 1 has been continuously detected by the sensors 17c and 17d having a relatively narrow detection range, it can be determined that the holder of the portable device 1 stops in the vicinity of the door.

When it is determined in step S460 that the holder of the portable device 1 stops in the vicinity of the door, it can be inferred that the holder of the portable device 1 has the will to ride in the vehicle. The key ECU 4 performs processing in and after step S60. Specifically, like the first embodiment, the key ECU 4 unlocks the door and automatically opens the door.

In the fourth embodiment, to detect the holder of the portable device 1, the sensor 17c, 17d may be other than the infrared sensor. For example, the sensor 17c, 17d may be a distance sensor such as an ultrasonic sensor that detects a distance from a door in the vehicle to the holder of the portable device 1. In this case, a distance to the holder of the portable device 1 detected by the distance sensor is continuously detected for a predetermined time. When the detected distance is not larger than a predetermined distance and the range of the detected distances fits within a predetermined fluctuation range, it can be determined that the holder of the portable device 1 stops in the vicinity of the vehicle door.

Figure 8:
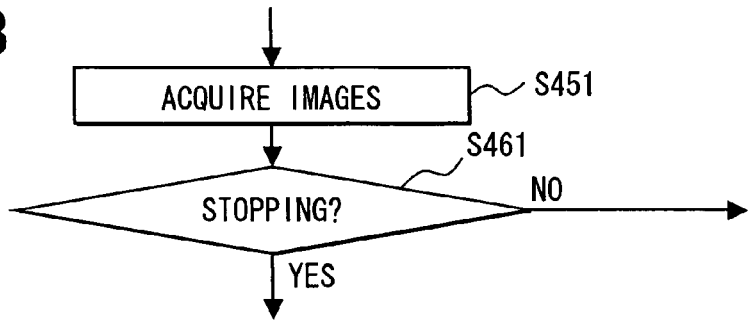
FIG. 8 is a flowchart showing processing for riding-time control executed in the vehicle unit according to a first variant of the fourth embodiment.

Further, the sensor 17c, 17d may be an image sensor that shoots the image of vicinity of a vehicle door. In this case, processing of step S450 and S460 of the flowchart of FIG. 7 may be replaced by processing of steps S451 and S461 shown in FIG. 8. Specifically, step S451 acquires plural images in the vicinity of the vehicle door shot plural times every predetermined time by the image sensor. Step S461 recognizes the holder of the portable device 1 from the plural images, and determines whether the holder of portable device 1 stops in the vicinity of the vehicle door. By using the image sensor in this way, whether the holder of the portable device 1 approaching the vehicle 10 has the will to ride in the vehicle 10 can be more correctly inferred.

Figure 9:
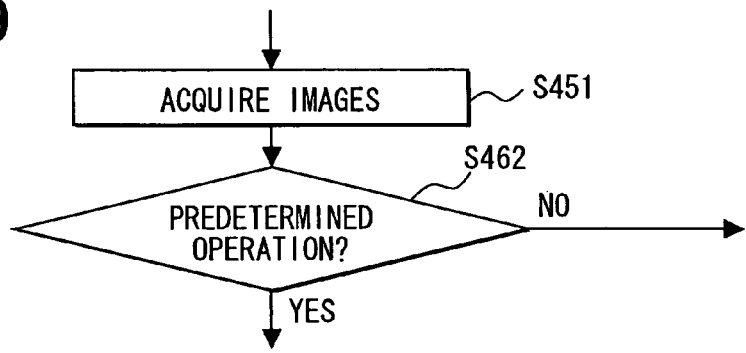
FIG. 9 is a flowchart showing processing for riding-time control executed in the vehicle unit according to a second variant of the fourth embodiment.

Furthermore, when the image sensor that shoots the image of vicinity of the vehicle doors is used, as shown in FIG. 9, step S462 determines whether the holder of the portable device 1 has performed a predetermined operation in the vicinity of the vehicle door, from the plural images, thereby to infer the will to ride in the vehicle 10. The key ECU 4 infers that the user is going to ride in the vehicle 10, for example, as the predetermined operation, when the holder of the portable device 1 has performed the operation of moving the holder's hand in the direction that opens the vehicle door in front of the vehicle door. By having the holder of the portable device 1 perform the predetermined operation in this way, the will to ride in the vehicle can be more correctly inferred.

Further, a voice input device may be used as the sensor 17c, 17d that inputs voice uttered by the holder of the portable device 1 and recognizes the inputted voice. In this case, processing of step S450 and S460 of the flowchart of FIG. 7 is replaced by processing of steps S452 and S463 shown in FIG. 10. Specifically, step S452 captures voice of the holder of the portable device 1 who has approached the vehicle door. Step S463 determines whether the inputted voice is the same as a preset keyword, as a result of subjecting the inputted voice to voice recognition processing.

By thus previously setting the keyword for automatic door opening and having the holder of the portable device 1 utter the keyword, the holder's will of the portable device 1 to ride in the vehicle can be clearly recognized.

Figure 11:
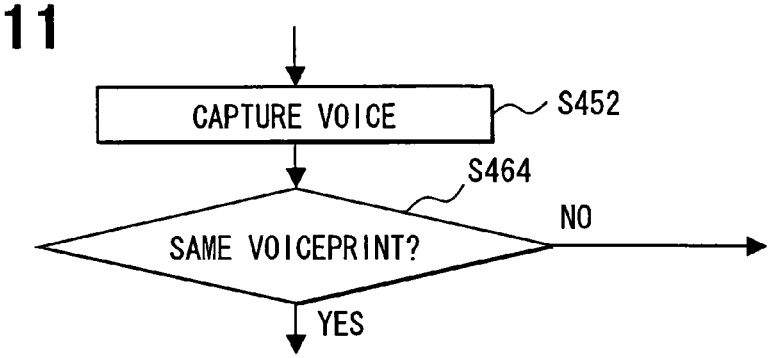
FIG. 11 is a flowchart showing processing for riding-time control executed in the vehicle unit according to a fourth variant of the fourth embodiment.

When a voice input device is used, as shown in FIG. 11, in step S464, the holder's will of the portable device 1 to ride in the vehicle may be confirmed by whether the voiceprint of inputted voice is the same as a voiceprint previously registered. In this case, the holder of the portable device 1 needs to utter some words to convey the will to ride in the vehicle to the vehicle unit 10a.

Particularly, in this example, by previously registering the voiceprint of the holder of portable device 1 in the voice input device, the vehicle doors can be prevented from being opening by third persons, contributing to improvement in security.

Figure 10:
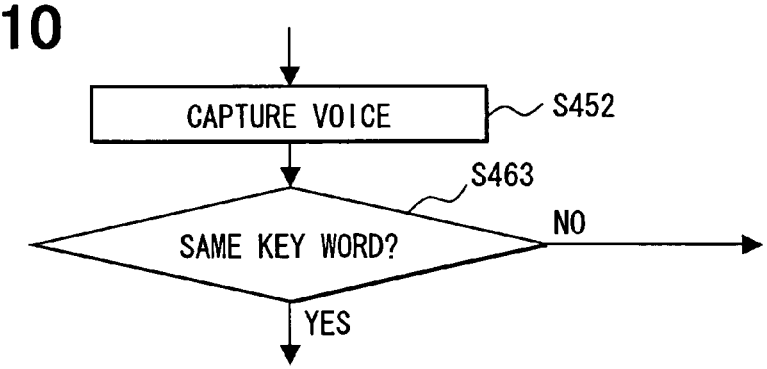
FIG. 10 is a flowchart showing processing for riding-time control executed in the vehicle unit according to a third variant of the fourth embodiment.

Processing shown in FIG. 10 and processing shown in FIG. 11 may be combined to have the holder of the portable device 1 utter a keyword and determine whether the holder's voiceprint coincides with the voiceprint of registered voice.

Fifth Embodiment

Figure 12:
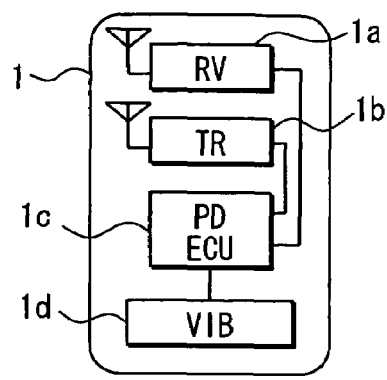
FIG. 12 is a block diagram showing the portable device according to a fifth embodiment of the present invention.
Figure 13:
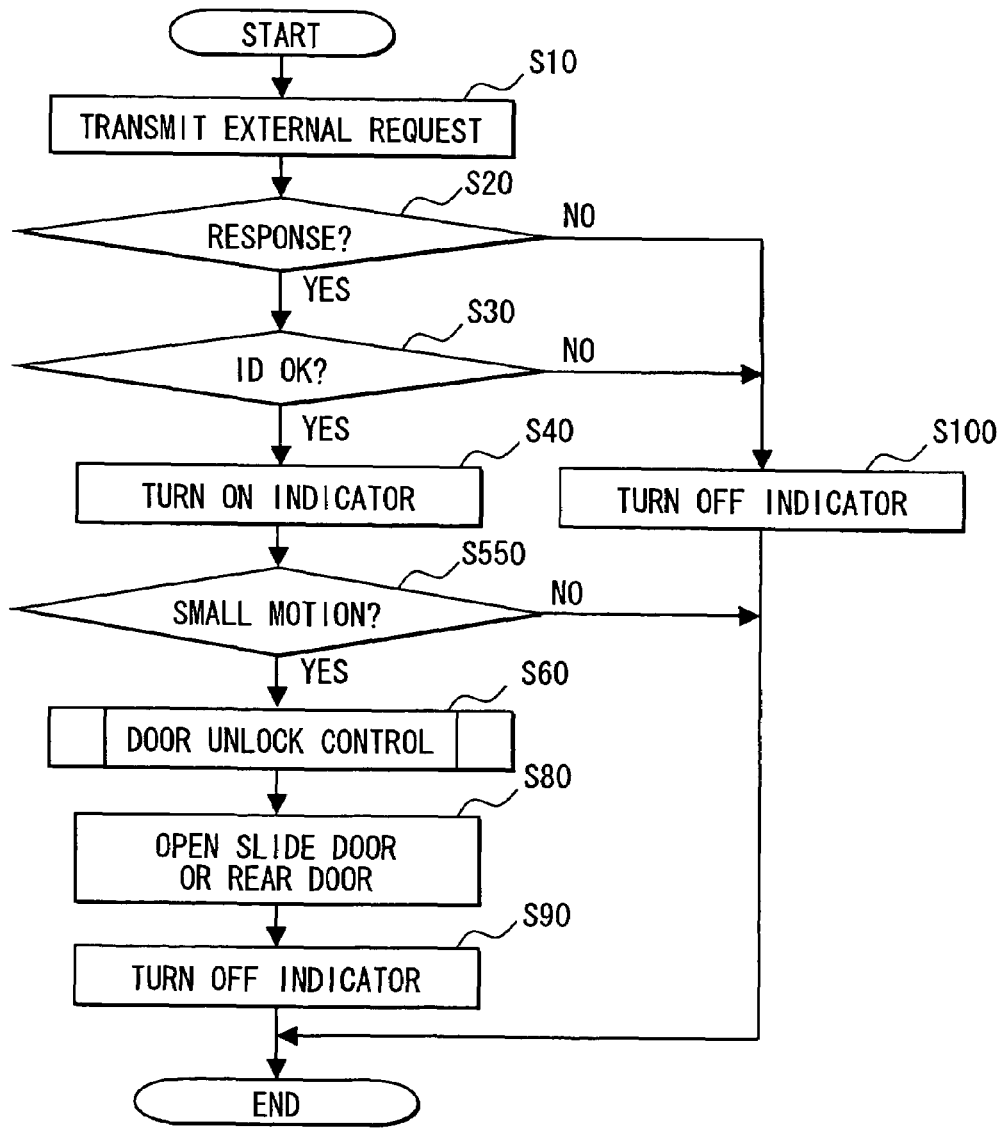
FIG. 13 is a flowchart showing processing for riding-time control executed in the vehicle unit according to the fifth embodiment.

In this fifth embodiment, the portable device 1 is constructed to determines whether the holder of the portable device 1 stops from an amount of motion of the portable device 1. The portable device 1 therefore includes a motion detection sensor for detecting a related value of an amount of the motion of the portable device 1, such as a vibration sensor 1d, as shown in FIG. 12.

Since the portable device 1 is usually held in a pocket or bag of the holder, when an amount of its motion becomes larger than a predetermined reference value in the vicinity of a vehicle door, it can be inferred that the holder of the portable device 1 has stopped in front of the vehicle door.

Processing for riding-time control performed by the vehicle unit 10a in this embodiment is basically the same as the flowchart shown in FIG. 2 of the first embodiment except processing of step S550. However, this embodiment is different from the first embodiment in that the portable device 1 returns a response signal including a detection value of the motion detection sensor as a response signal. Therefore, when receiving the response signal from the portable device 1, the key ECU 4 acquires information indicating an amount of the motion of the portable device 1.

In step S550, based on information indicating the amount of the motion of the portable device 1 included in the response signal, the key ECU 4 determines whether it is less than a prescribed value indicating a small motion. When it is determined in the determination processing that the amount of the motion of the portable device 1 is less than the prescribed value, since it can be inferred that the holder of the portable device 1 has stopped to ride in the vehicle, the key ECU 4 performs processing in and after step S60.

Also by thus providing the portable device 1 with a sensor that detects the amount of motion, the holder's will of the portable device 1 to ride in the vehicle can be inferred. As the motion detection sensor, an acceleration sensor and a yaw rate sensor may be used, in addition to a vibration sensor that detects the amount of vibration applied to the portable device 1.

Sixth Embodiment

The vehicle door control system according to the sixth embodiment is constructed similarly to the vehicle door control system according to the above-mentioned first embodiment. As described in the first embodiment, the vehicle unit 10a periodically transmits request signals to repeatedly make intercommunications with the portable device 1 when the portable device 1 is within a communication area. In the sixth embodiment, in the intercommunications repeatedly performed, the key ECU 4 acquires information on receiving levels of the plural request signals in the portable device 1, and when the plural receiving levels are larger than a predetermined threshold value and their fluctuation range is within a predetermined range, the key ECU 4 infers that the holder of the portable device 1 is going to ride in the vehicle.

Figure 14:
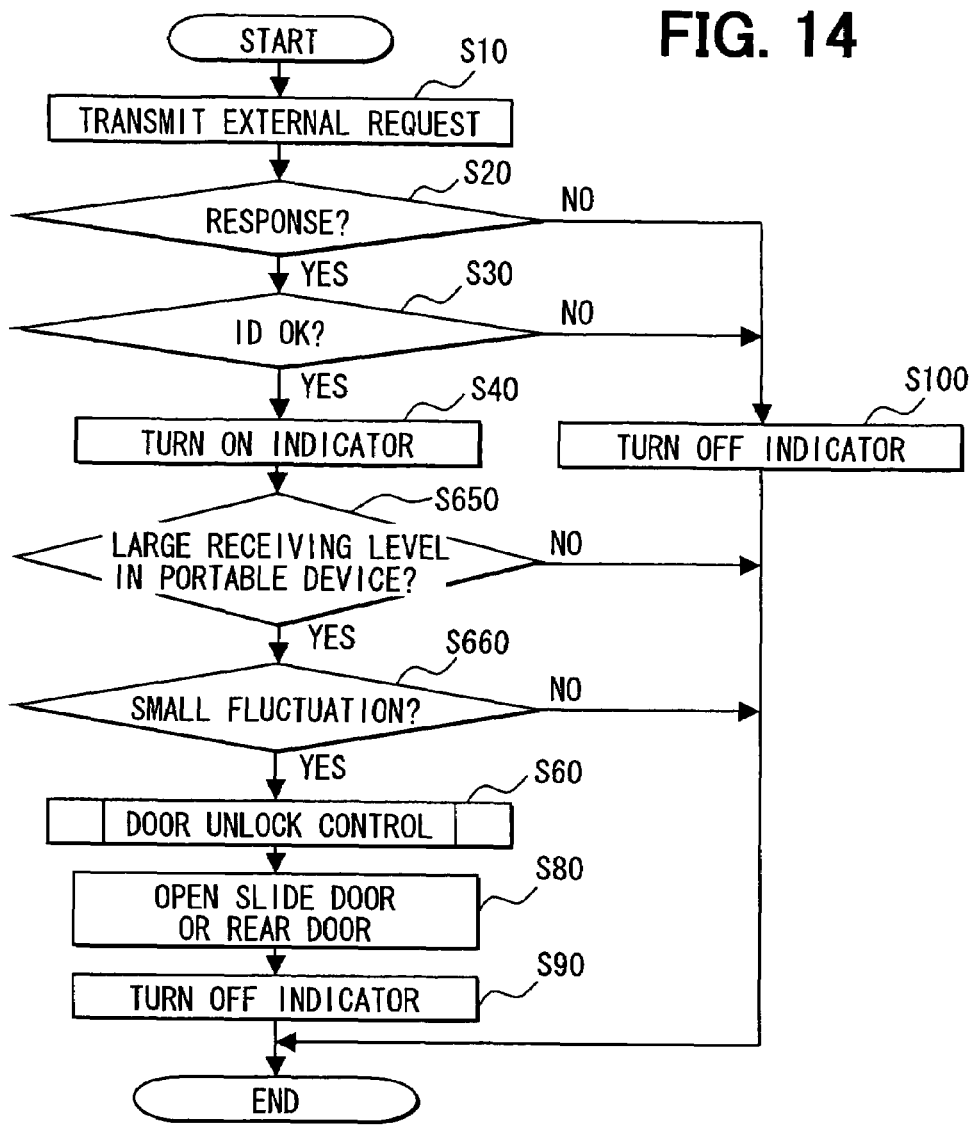
FIG. 14 is a flowchart showing processing for riding-time control executed in the vehicle unit according to a sixth embodiment of the present invention.

FIG. 14 is a flowchart showing processing for riding-time control executed in the vehicle unit 10a of this embodiment. The flowchart of FIG. 14 is similar to the flowchart of FIG. 2 except processing of steps S650 and S660. In this embodiment, however, since the key ECU 4 determines the receiving level of a request signal in the portable device 1, the portable device 1 is constructed to return a response signal including information indicating the receiving level. Accordingly, when the vehicle unit 10a has received a response signal from the portable device 1, it can acquire information on the receiving level.

Step S650 determines whether all the receiving levels of plural request signals in the portable device 1 are larger than the threshold value. Step S660 determines whether a fluctuation width of a predetermined number of receiving levels fits within a predetermined fluctuation range. When both the determination processing result in "Yes," it can be determined that the receiving levels of request signals of the portable device 1 are large and stable. Accordingly, in this case, it can be determined that the holder of the portable device 1 almost stops near the vehicle door. It can be inferred from the holder's condition of the portable device 1 that the holder of the portable device 1 has the will to ride in the vehicle.

In the sixth embodiment, the holder's condition of the portable device 1 is inferred from the receiving levels of request signals in the portable device 1. However, likewise, the holder's condition of the portable device 1 can be inferred from the receiving levels of request signals in the vehicle unit 10a.

Figure 15:
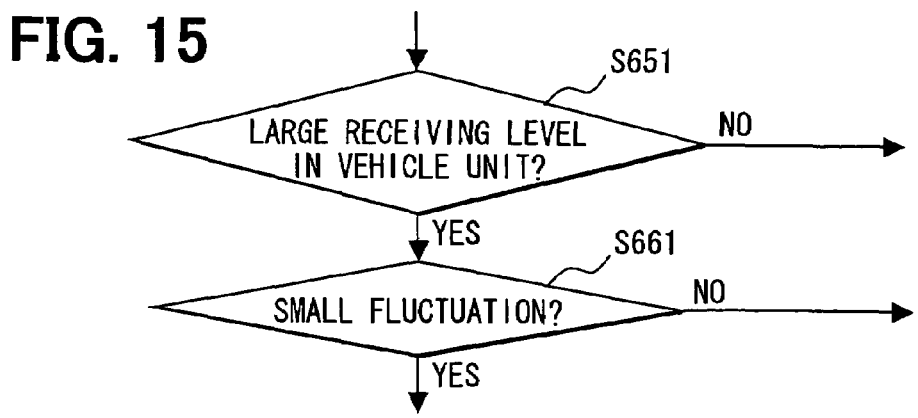
FIG. 15 is a flowchart showing processing for riding-time control executed in the vehicle unit according to a variant of the sixth embodiment.

In this case, the processing of steps S650 and S660 in the flowchart of FIG. 14 may be replaced by processing of steps S651 and S661 shown in FIG. 15. Specifically, step S651 determines whether all the receiving levels of response signals received plural times in the vehicle unit 10a, that is, the receiving level in the receiver 3 is larger than the threshold value. Moreover, step S661 determines whether a fluctuation width of a predetermined number of receiving levels fits within a predetermined fluctuation range. Also by this method, it can be determined whether the holder of the portable device 1 almost stops near the vehicle door.

Seventh Embodiment

The vehicle door control system according to this embodiment performs control to automatically close and lock the vehicle doors 11 to 15 when the holder of the portable device 1 gets off the vehicle 10. In this control, the vehicle doors are automatically closed and locked when the holder of the portable device 1 merely moves away from the vehicle without closing the vehicle doors when the holder of the portable device 1 gets off the vehicle. Thereby, the convenience of the holder of the portable device 1 when getting off the vehicle 10 can be significantly increased.

Figure 16:
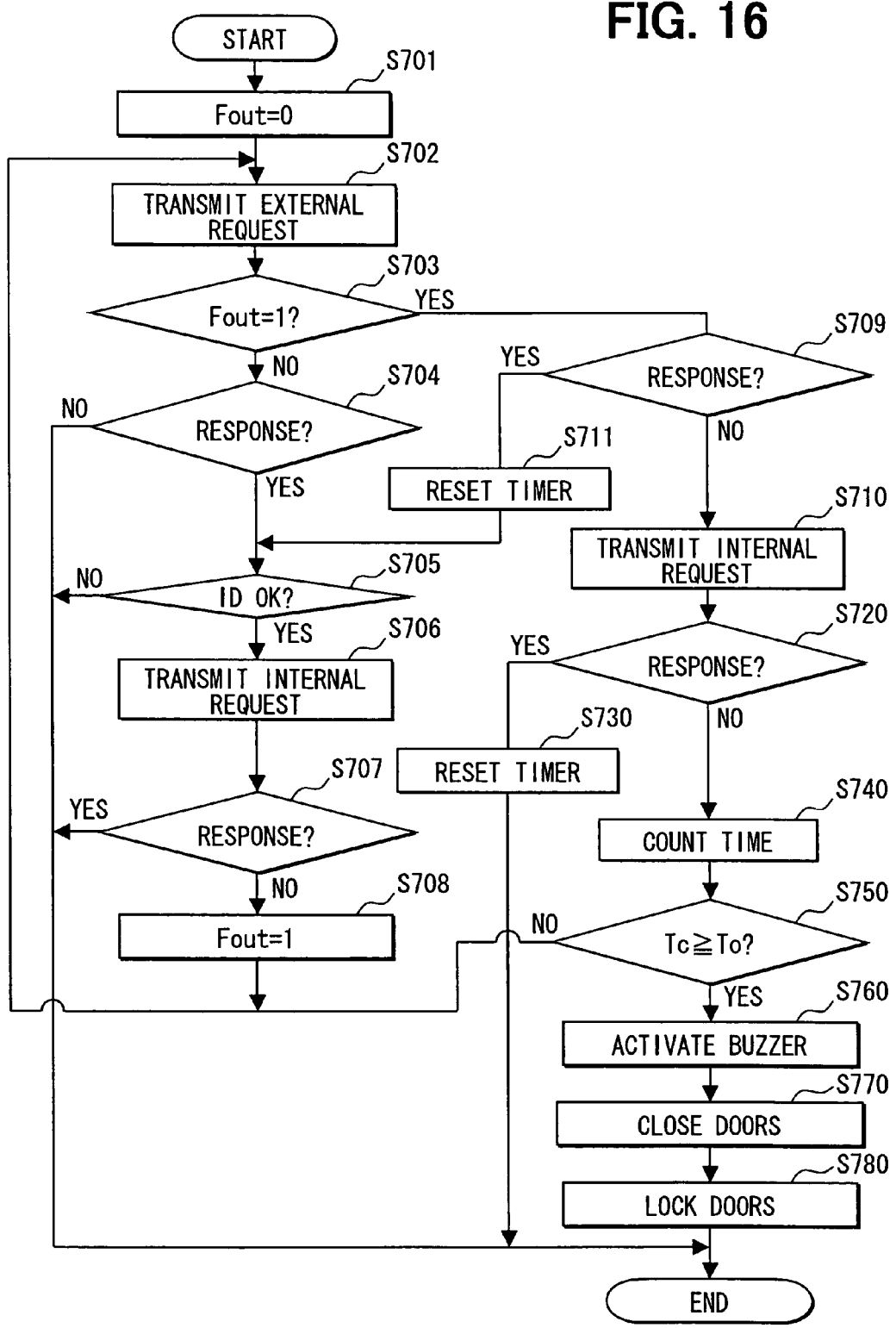
FIG. 16 is a flowchart showing processing for riding-time control executed in the vehicle unit according to a seventh embodiment of the present invention.

In this embodiment, the key ECU 4 performs processing of FIG. 16, when the holder of the portable device 1 gets off the vehicle 10. This processing is performed, for example, whenever the vehicle engine is stopped, or the vehicle door 11 adjacent to the driver's seat is opened after the engine stops.

Step S701, as initial processing, resets to zero an outside-vehicle flag Fout indicating that the portable device 1 is outside the vehicle. Step S702 transmits a request signal from one of the external transmitters 2a to 2e corresponding to an opened vehicle door or all the external transmitters 2a to 2e. Step S703 determines whether the outside-vehicle flag Fout has been set to one, and when it has been reset to zero, the processing proceeds to step S704. When set to one, the processing proceeds to step S709. When the processing of FIG. 16 is executed the first time that the vehicle stops, the outside-vehicle flag Fout is zero and the processing proceeds to step S704.

Step S704 determines whether a response signal has been received from the portable device 1, in response to the request signal from the external transmitters 2a to 2e. On determining that the response signal has been received, the processing proceeds to step S705 to determine whether the checking of the ID code included in the response signal is determined as OK.

In the determination processing, when the checking of the ID code is determined as OK, in step S706, the processing transmits a request signal from the internal transmitter 2f. This is done to check whether the portable device 1 is confined in the vehicle interior when the vehicle doors 11 to 15 are locked with the portable device 1 left in the vehicle interior. When a response signal is received from the portable device 1 in response to the request signal from the internal transmitter 2f, since the portable device 1 may be confined in the vehicle interior, the key ECU 4 terminates the processing shown in FIG. 16 without performing subsequent processing. The key ECU 4 also terminates the processing when it is determined in step S704 that a response signal responding to the request signal from the external transmitters 2a to 2e is not received, and in step S705 that the checking of the ID code is determined as NG.

When step S706 determines that a response signal is not received in response to the request signal from the internal transmitter 2f, the processing proceeds to step S708 to set the outside-vehicle flag Fout to 1 because it has been confirmed that the portable device 1 is outside the vehicle. Then, the processing returns to step S702.

A request signal is transmitted again from the external transmitters 2a to 2e in step S702. When it is determined in step S703 that the outside-vehicle flag Fout is set to one, step S709 is performed. Step S709 determines whether a response signal has been received from the portable device 1. On determining as having been received, the key ECU 4 performs step S711. On determining as having not been received, the key ECU 4 performs step S710.

Since the holder of the portable device 1 still stays in a communication area formed around the vehicle door, step S711 resets a timer to count elapsed time after the holder of the portable device 1 moves out of the communication area. Then, the key ECU 4 repeats the processing from step S705.

On the other hand, step S710 transmits a request signal from the internal transmitter 2*f*. This is done to determine whether a response signal is not received in response to the request signal from the external transmitters 2*a* to 2*e* because the holder of the portable device 1 temporarily moved out of the vehicle, but he or she has returned again to the vehicle. Step S720 determines whether a response signal has been received from the portable device 1 in response to the request signal from the external transmitter 2*f*. When it is determined as having been received, the key ECU 4 resets the timer in step S740, and then terminates the processing shown in FIG. 16. On the other hand, when it is determined in step S720 that a response signal is not received from the portable device 1 in response to the request signal from the external transmitter 2*f*, it is conceivable that the holder of the portable device 1 moves out of the communication area outside the vehicle 10 and is going away from the vehicle 10. Accordingly, step S740 counts elapsed time by the timer after the holder of the portable device 1 moves out of the communication area.

Step S750 determines whether a count value Tc of the timer has become larger than a predetermined time To. When it is determined in step S750 that the count value Tc of the timer has become larger than the predetermined time To, the processing proceeds to step S760 and activate or sounds the buzzer to notify the holder of the portable device 1 that the doors 13 to 15 provided with the automatic opening/closing function will soon be automatically closed. This advance notice of automatic closing of the doors 13 to 15 can be made also in the portable device 1 by transmitting a door close notice signal to the portable device 1, as in the second embodiment.

Step S770 automatically closes the slide doors 13 and 14, and/or the rear door 15 by the driving units 9*c*, 9*d*, and 16. Then, step S780 locks all the doors 11 to 15 of the vehicle 10. When it is determined in step S750 that the count value Tc of the timer has not reached the predetermined time To, the above processing is repeatedly performed until the predetermined time is reached.

As described above, in this embodiment, the situation in which the holder of the portable device 1 is going away from the vehicle 10 is inferred from the state of communication between the vehicle unit 10*a* and the portable device 1, to automatically close and lock the vehicle doors. Accordingly, the convenience of the holder of the portable device 1 when getting off the vehicle 10 can be significantly increased.

Eighth Embodiment

In the eighth embodiment, to detect the motion of the holder of the portable device 1 who gets off the vehicle, image sensors are provided that acquire the images of the vicinity of the vehicle doors 13 and 15.

The vehicle door control system according to this embodiment infers from plural images acquired by the image sensors that when the holder of the portable device 1 performs an operation of issuing a command to close a vehicle door, the holder of the portable device 1 intends to terminate use of the vehicle 10 and park the vehicle 10. In such a case, the vehicle unit 10*a* automatically closes the vehicle doors 13 to 15 to increase the convenience of the holder of the portable device 1 when getting off the vehicle 10. Furthermore, the key ECU 4 locks the vehicle doors 11 to 15.

Figure 17:
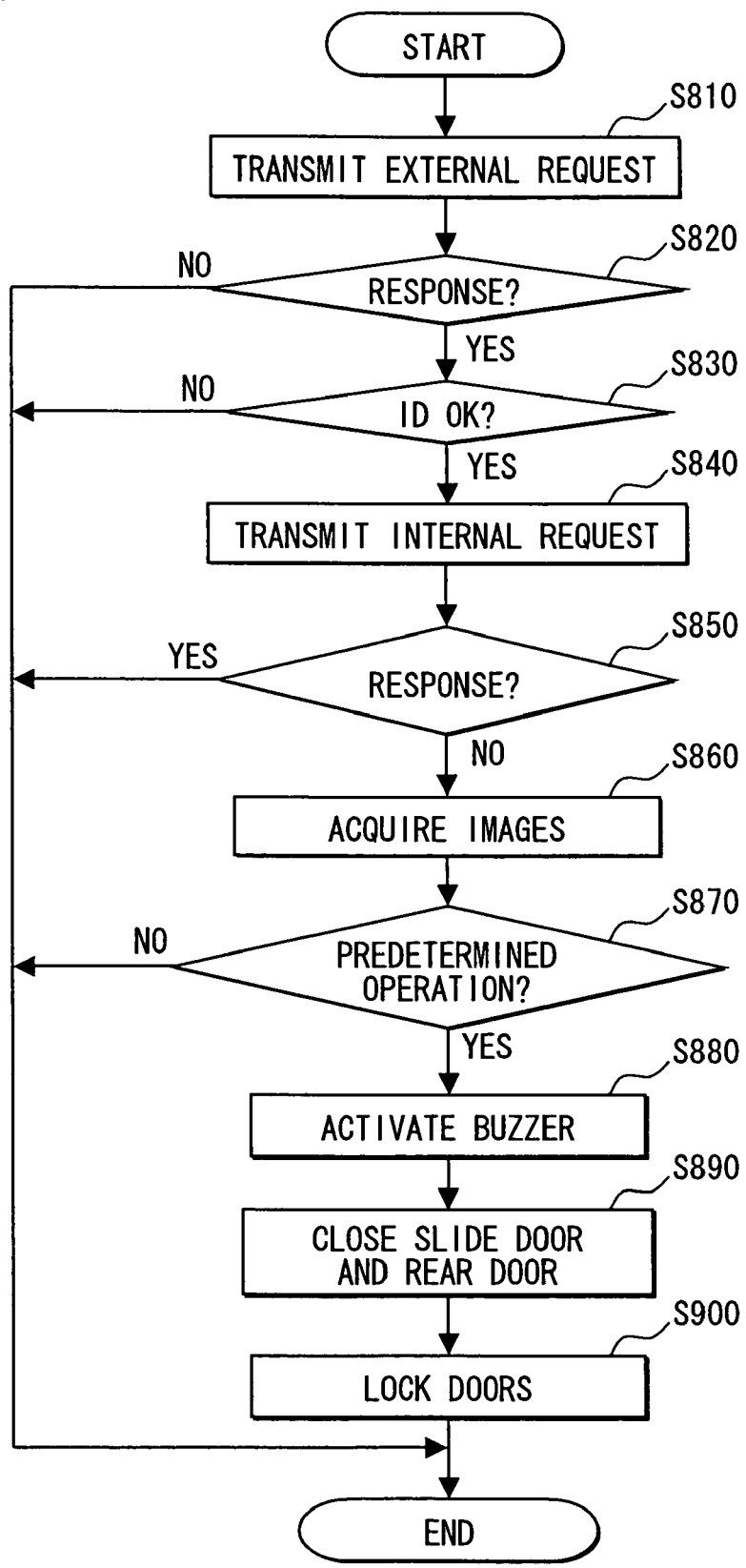
FIG. 17 is a flowchart showing processing for riding-time control executed in the vehicle unit according to an eighth embodiment of the present invention.

In this embodiment, processing shown in FIG. 17 is performed whenever the vehicle 10 stops. Step S810 transmits a request signal from one of the external transmitters 2*a* to 2*e* corresponding to an opened vehicle door or all the external transmitters 2*a* to 2*e*. Step S820 determines whether a response has been received from the portable device 1 in response to the request signal from the external transmitters 2*a* to 2*e*. On determining that the response signal has been received, the processing proceeds to step S830 to determine whether the checking of the ID code included in the response signal is OK.

In the determination processing, when the checking of the ID code is determined as OK, in step S840, the a request signal is transmitted from the internal transmitter 2*f*. This is done to check whether the portable device 1 is confined in the vehicle interior when the vehicle doors 11 to 15 are locked with the portable device 1 left in the vehicle interior. When the response signal is received from the portable device 1 in response to the request signal from the internal transmitter 2*f*, since the portable device 1 may be confined in the vehicle interior, the key ECU 4 terminates the processing shown in FIG. 17 without performing subsequent processing. The key ECU 4 also terminates the processing when it is determined in step S820 that the response signal responding to the request signal from the external transmitters 2*a* to 2*e* is not received, and in step S830 that the checking of the ID code is determined as NG.

When step S850 determines that the response signal is not received in response to the request signal from the internal transmitter 2*f*, the processing proceeds to step S860 to acquire plural images in the vicinity of the vehicle doors shot plural times every predetermined time by the image sensors. Step S870 recognizes the holder of the portable device 1 from the plural images, and determines whether the holder of the portable device 1 has performed a predetermined setting operation for automatically closing the vehicle doors 13 to 15. An example of the setting operation is that the holder of the portable device 1 moves a holder's hand in the direction that closes the door.

When it is determined in step S870 that the setting operation has been performed, it can be inferred that the holder of the portable device 1 intends to terminate the driving of the vehicle and park the vehicle. The processing proceeds to steps S880, S890 and S900 to activate the buzzer, automatically close the sliding and rear doors 13 to 15 and locks all the doors 11 to 15.

By thus using the image sensors, it can be more correctly inferred whether the holder of the portable device 1 intends to terminate the driving of the vehicle and park the vehicle.

To check the holder's will of the portable device 1 to park the vehicle, besides using the image sensors, a voice input device may be used that inputs voice uttered by the holder of the portable device 1 and recognizes the inputted voice. In this case, for example, when the holder of the portable device 1 utters a preset keyword indicating the parking of the vehicle, or the voiceprint of some voice uttered by the holder of the portable device 1 coincides with a voiceprint previously registered, it can be determined that the holder of the portable device 1 has the will to park the vehicle.

By thus setting a keyword or registering voice for automatically opening doors, the will to park the vehicle can be more correctly determined using the voice of the holder of the portable device 1.

Ninth Embodiment

The vehicle door control system according to this embodiment is constructed similarly to the vehicle door control systems according to the above first to eighth embodiments. It is however different in that the conditions of the sliding type vehicle door on the side of the driver's seat are indicated according to lighting conditions of the indicators. FIG. 18 is a table showing lighting conditions in the vehicle unit 10a.

In this embodiment, in the vehicle unit 10a, the indicator 6c1 is blinked instead of step S40 of the flowchart of FIG. 2, and the indicator 6c1 is blinked instead of step S70.

As shown in FIG. 18, it is determined whether a predetermined relation is satisfied (ID code checking OK/NG determination), such as whether an ID code included in the response signal to the external transmitter 2a or 2c of the driver's seat door 11 or the sliding type door 13 on the part of the driver's seat coincides with the ID code previously registered. When the checking of the ID code is determined as OK in the determination processing, the indicator 6c1 provided in the door 13 on the part of the drivers seat is blinked, to notify the holder of the portable device 1 that the checking of the ID code is determined as OK, and one of conditions of automatically opening the doors has been satisfied.

It is determined whether the response signal has been received continuously received over a second predetermined period longer than a predetermined period during which the request signal from the external transmitter 2a or 2c of the drivers seat door 11 or the sliding type door 13 on the part of the driver's seat is transmitted. Specifically, the vehicle unit 10a stores the result of receiving a response signal when ID checking is determined as OK, and determines whether the response signal has been continuously stored over the second predetermined period or longer.

When it is determined that the response signal has been received continuously over the second predetermined period or longer, it can be determined that the holder of the portable device 1 has not merely passed by the vehicle but has stayed in the vicinity of the vehicle for at least the second predetermined period. Hence, it can be inferred that the holder of portable device 1 is going to ride in the vehicle.

In this case, the vehicle unit 10a lights the indicator 6c1 to previously notify the holder of the portable device 1 that the sliding type door 13 on the part of the driver's seat that he or she approaches is automatically opened. Since the indicator switches to a lighting state from a blinking state, the holder of the portable device 1 can recognize that the door toward which the holder is heading will be automatically opened. The door is unlocked and is controlled to be slidingly opened.

What is claimed is:

1. A vehicle door control system comprising:
a portable device for receiving are request signal and transmitting a response signal including an ID code thereof in response to the request signal; and
a vehicle unit mounted in a vehicle for transmitting the request signal, receiving the response signal from the portable device through intercommunications, checking the ID code included in the response signal and controlling conditions of vehicle doors according to a check result of the ID code,
wherein the vehicle unit includes
a lock condition control unit that controls lock and unlock conditions of the vehicle doors;
an automatic opening/closing unit that automatically opens and closes the vehicle doors,
an inferring means that infers whether a holder of the portable device is going to ride in the vehicle; and
a riding-time control means that unlocks the vehicle doors by the lock condition control unit and automatically opens the vehicle doors by the automatic opening/closing unit when the check result of the ID code included in the response signal responding to the request signal transmitted to an exterior of the vehicle with the vehicle doors locked is determined as OK, and it is inferred by the inferring means that the holder of the portable device is going to ride in the vehicle,
wherein the vehicle unit repeatedly performs intercommunications with the portable device and acquires information on receiving levels of plural request signals in the portable device through the intercommunications repeatedly performed; and
the inferring means infers that the holder of the portable device is going to ride in the vehicle when the plural receiving levels are larger than a predetermined threshold value and a fluctuation range of the receiving levels is within a predetermined range.

2. The vehicle door control system according to claim 1, wherein:
the vehicle unit includes a notifying means that, when the vehicle doors are automatically opened by the automatic opening/closing unit, notifies a user of the fact.

3. The vehicle door control system according to claim 2, wherein:
the notifying means makes a first notification when the check result of the ID code is determined as OK when the vehicle doors are locked; and
the notifying means makes a second notification different from the first notification when the inferring means infers the holder of the portable device is going to ride in the vehicle.

4. The vehicle door control system according to claim 3, wherein the notifying means includes an indicator that is blinked as the first notification, and lighted as the second notification.

5. The vehicle door control system according to claim 1, wherein:
the riding-time control means transmits a door open notice signal to the portable device when the vehicle doors are automatically opened by the automatic opening/closing unit; and
the portable device includes a door open notice means on the portable device side that, when receiving the door open notice signal, indicates that the vehicle doors are automatically opened.

6. The vehicle door control system according to claim 1, wherein the riding-time control means unlocks the vehicle doors by the lock condition control unit when the check result of the ID code is determined as OK, and then locks the vehicle doors by the lock condition control unit when the response signal from the portable device has not been received.

7. The vehicle door control system according to claim 1, wherein the vehicle unit further includes a prohibiting means that prohibits the vehicle doors from being opened and closed by the automatic opening/closing unit according to commands from the holder of the portable device.

8. The vehicle door control system according to claim 7, wherein the prohibiting means includes a switch operable by the holder of the portable device and mounted at at least one of an outer side of the vehicle and within an interior of the vehicle in a vicinity of the vehicle doors, thereby to prohibit the vehicle doors from being opened and closed by the automatic opening/closing unit when the switch is operated.

* * * * *